(12) United States Patent
Nakashima (10) Patent No.: US 8,976,258 B2
(45) Date of Patent: Mar. 10, 2015

(54) IMAGE PROCESSING APPARATUS, IMAGE CAPTURING APPARATUS, AND PROGRAM

(71) Applicant: Panasonic Corporation, Osaka (JP)

(72) Inventor: Toshiyuki Nakashima, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 116 days.

(21) Appl. No.: 13/738,069

(22) Filed: Jan. 10, 2013

(65) Prior Publication Data
US 2013/0176488 A1    Jul. 11, 2013

(30) Foreign Application Priority Data
Jan. 11, 2012   (JP) ................................ 2012-002735

(51) Int. Cl.
*H04N 5/228* (2006.01)
*H04N 5/14* (2006.01)
*H04N 7/01* (2006.01)

(52) U.S. Cl.
CPC .............. *H04N 7/014* (2013.01); *H04N 7/0132* (2013.01)
USPC ....................... 348/222.1; 348/699

(58) Field of Classification Search
CPC .............................. H04N 7/0127; H04N 7/013
USPC ............... 348/222.1, 441, 448, 449, 699, 700
See application file for complete search history.

(56) References Cited

U.S. PATENT DOCUMENTS

| 2009/0059065 | A1* | 3/2009 | Yamasaki ...................... 348/441 |
| 2009/0123083 | A1* | 5/2009 | Kawase et al. ................. 382/254 |
| 2010/0079665 | A1* | 4/2010 | Yamauchi et al. ........... 348/416.1 |
| 2011/0279684 | A1* | 11/2011 | Motoyama et al. ........... 348/181 |
| 2012/0008689 | A1* | 1/2012 | Nasu et al. ................ 375/240.16 |
| 2012/0154675 | A1* | 6/2012 | Nasu et al. ..................... 348/452 |
| 2013/0176487 | A1* | 7/2013 | Nakashima ................... 348/452 |

FOREIGN PATENT DOCUMENTS

| JP | 2007-235403 A | 9/2007 |
| JP | 2010/177739 A | 8/2010 |

OTHER PUBLICATIONS

Co-pending U.S. Appl. No. 13/738,042, filed Jan. 10, 2013.
Co-pending U.S. Appl. No. 13/738,208, filed Jan. 10, 2013.
Co-pending U.S. Appl. No. 13/738,439, filed Jan. 10, 2013.

* cited by examiner

*Primary Examiner* — Timothy J Henn
(74) *Attorney, Agent, or Firm* — Renner, Otto, Boisselle & Sklar, LLP (57) ABSTRACT

An exemplary image processing apparatus generates an interpolation frame to be inserted between a first frame and a second frame of a moving picture contiguous with each other. The image processing apparatus includes: a repetitive pattern detection section configured to detect whether a repetitive pattern is present in at least one of the first and second frames; a motion vector calculation section configured to calculate a motion vector of an object in the first and second frames; and an interpolation frame generation section configured to compare a repetition cycle of the repetitive pattern in a first direction with a magnitude of the motion vector in the first direction so as to generate the interpolation frame through a process performed based on a result of the comparison.

12 Claims, 8 Drawing Sheets

FIG. 8

IMAGE PROCESSING APPARATUS, IMAGE CAPTURING APPARATUS, AND PROGRAM

BACKGROUND

1. Technical Field

The present disclosure relates to an image processing apparatus capable of converting a frame rate of a moving picture obtained through an image capturing operation.

2. Description of the Related Art

Japanese Laid-Open Patent Publication No. 2010-177739 discloses an image processing apparatus. The image processing apparatus generates interpolation frame images to be inserted between frame images. The image processing apparatus of Japanese Laid-Open Patent Publication No. 2010-177739 calculates the search area for a motion vector of an interpolation pixel included in an interpolation frame image based on a change in the pixel value within each frame of a plurality of frame images, and generates an interpolation frame image based on a motion vector estimated in the calculated search area.

SUMMARY

Where an interpolation frame is generated using a motion vector, if an object having a repetitive pattern, such as a fence or a lattice, is present in the image, it is highly likely that the motion vector is calculated erroneously, failing to obtain an appropriate interpolation frame.

One non-limiting, and exemplary embodiment of the present disclosure provides a technique to generate a more appropriate interpolation frame even if an object having a repetitive pattern is present in a moving picture.

In one general aspect, an image processing apparatus disclosed herein generates an interpolation frame to be inserted between a first frame and a second frame, contiguous with each other, in a moving picture. The image processing apparatus includes: a repetitive pattern detection section configured to detect whether a repetitive pattern is present in at least one of the first and second frames; a motion vector calculation section configured to calculate a motion vector of an object in the first and second frames; and an interpolation frame generation section configured to compare a repetition cycle of the repetitive pattern in a first direction with a magnitude of the motion vector in the first direction so as to generate the interpolation frame through a process performed based on a result of the comparison.

According to the above aspect, it is possible to generate a more appropriate interpolation frame even if an object having a repetitive pattern is present in a moving picture.

These general and specific aspects may be implemented using a system, a method, and a computer program, and any combination of systems, methods, and computer programs.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

DETAILED DESCRIPTION

An embodiment will now be described in detail, referring to the drawings. Note however that unnecessarily detailed descriptions may be omitted. For example, detailed descriptions on what are well known in the art or redundant descriptions on substantially the same configurations may be omitted. This is to prevent the following description from becoming unnecessarily redundant, to make it easier for a person of ordinary skill in the art to understand.

Note that the present inventor provides the accompanying drawings and the following description in order for a person of ordinary skill in the art to sufficiently understand the present disclosure, and they are not intended to limit the subject matter set forth in the claims.

(Embodiment 1)

Embodiment 1, in which the technique of the present disclosure is applied to a digital video camera, will now be described with reference to the drawings. In the following description, data representing each of the individual still images of a moving picture will be referred to as a "frame image" or simply a "frame". A frame to be inserted between two contiguous frames will be referred to as an "interpolation frame image" or simply an "interpolation frame".

[1-1. Outline]

A digital video camera (hereinafter also referred to simply as a "camera") of the present embodiment is an image capturing apparatus capable of capturing a moving picture. The digital video camera of the present embodiment is capable of converting a frame rate on-the-fly during the operation of capturing a moving picture, or after the operation, in response to a user instruction, etc. The digital video camera of the present embodiment changes the frame rate by inserting an interpolation frame image between contiguous frame images obtained through an image capturing operation. For example, when performing a movie capturing operation at 60 frames per second, the operation can be switched to a movie capturing operation at 120 frame per second by inserting interpolation frame images between frames. The time when the digital video camera switches frame rates from one to another may be when a user gives an instruction to change the frame rate, when information (e.g., brightness information) obtained from an image captured through an image capturing operation (hereinafter referred to as a "captured image".) is changed, or when a predetermined mode (e.g., a low-speed image capturing mode) is selected.

[1-2. Configuration of Digital Video Camera]

Figure 1:
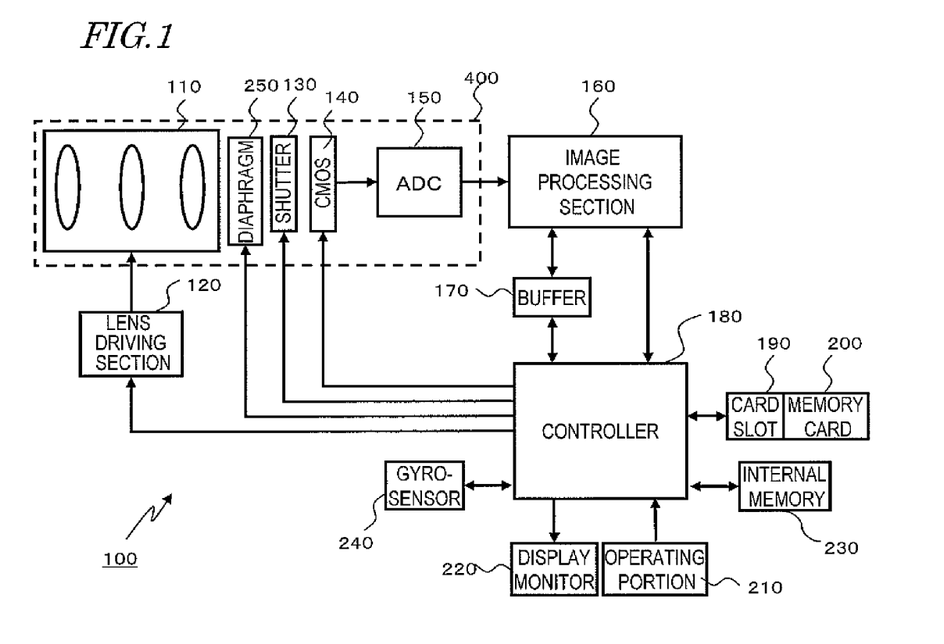
FIG. 1 is a block diagram showing a configuration of a digital video camera according to example Embodiment 1.

First, a configuration of a digital video camera according to the present embodiment will be described with reference to FIG. 1. FIG. 1 is a block diagram showing a configuration of the digital video camera 100. The digital video camera 100 uses a CMOS image sensor 140 to capture an object image formed by an optical system 110 including one or more lenses. The image data generated by the CMOS image sensor 140 is subjected to various processes by an image processing section 160, and stored in a memory card 200. The configuration of the digital video camera 100 will now be described in detail.

The optical system 110 has a group of lenses, including a zoom lens and a focus lens. By moving the zoom lens along the optical axis, it is possible to enlarge/shrink the object image. By moving the focus lens along the optical axis, it is possible to adjust the focus of the object image. Note that while three lenses are shown in FIG. 1 as an example, the number of lenses of the optical system 110 is appropriately determined in accordance with the required functionality.

A lens driving section 120 drives various lenses included in the optical system 110. The lens driving section 120 includes, for example, a zoom motor for driving the zoom lens and a focus motor for driving the focus lens.

A diaphragm 250 adjusts the size of the opening, thereby adjusting the amount of light to pass therethrough, in accordance with the user settings or automatically.

A shutter 130 is a means for blocking light from entering the CMOS image sensor 140.

The CMOS image sensor 140 is an image capturing device for generating image data through photoelectric conversion of an object image formed by the optical system 110. The CMOS image sensor 140 performs various operations, such as exposure, transfer, electronic shutter, etc. The CMOS image sensor 140 generates new image data at intervals of a certain amount of time. While the CMOS image sensor 140 is used as an image capturing device in the present embodiment, image capturing apparatuses of other types may also be used, such as a CCD image sensor or an NMOS image sensor.

An A/D converter (ADC) 150 is a circuit, electrically connected to the CMOS image sensor 140, for converting analog image data generated by the CMOS image sensor 140 to digital image data.

In the present embodiment, a plurality of elements including the optical system 110, the diaphragm 250, the shutter 130, the CMOS sensor 140 and the ADC 150 together form an image capturing section 400. The image capturing section 400 generates and outputs digital moving picture data including a plurality of contiguous frames.

The image processing section 160 can be implemented by a digital signal processor (DSP), a microcomputer, or the like, for example. The image processing section 160 is electrically connected to the ADC 150, and performs various processes on the image data generated by the CMOS image sensor 140, to generate image data to be displayed on a display monitor 220, and image data to be stored in the memory card 200. The image processing section 160 performs various processes, such as gamma correction, white balance correction, scar correction, etc., for example, on the image data generated by the CMOS image sensor 140. The image processing section 160 compresses image data generated by the CMOS image sensor 140 in accordance with a compression scheme, etc., in conformity with the H.264 standard, the MPEG2 standard, or the like.

The image processing section 160 can further calculate the motion vector based on the image data (frame) generated by the CMOS image sensor 140. Then, the image processing section 160 can generate an interpolation frame image by motion compensation based on the calculated motion vector and the frame image associated with the motion vector. Alternatively, the image processing section 160 can generate an interpolation frame through averaging by adding together a plurality of correlated frame images at a predetermined ratio without using motion compensation. The details of the process of generating these interpolation frames will be described later.

A controller 180 is a control means for controlling the entire digital camera. The controller 180 can be implemented by a semiconductor device, or the like. The controller 180 may be implemented only by hardware, or may be implemented by a combination of hardware and software. The controller 180 can be implemented by, for example, a microcomputer, or the like. Alternatively, it may be implemented by a single semiconductor chip, together with the image processing section 160, etc. As shown in FIG. 1, the controller 180 is electrically connected to the image processing section 160 and various other sections, and sends control signals thereto.

Note that the image processing section 160 and the controller 180 may be implemented by separate semiconductor chips or by a single semiconductor chip. There is no limitation on these physical configurations as long as processes to be described later can be realized.

A buffer 170 is electrically connected the image processing section 160 and the controller 180, and serves as a work memory thereof. The buffer 170 can be implemented by, for example, a DRAM, a ferroelectric memory, or the like.

A card slot 190 is capable of receiving the memory card 200, and can be mechanically and electrically connected to the memory card 200. The memory card 200 includes therein a flash memory, a ferroelectric memory, or the like, and can store data such as an image file generated by the image processing section 160.

An internal memory 230 is implemented by a flash memory, a ferroelectric memory, or the like. The internal memory 230 stores a control program, etc., for controlling the entire digital video camera 100. The control program is executed by the controller 180.

A operating portion 210 generally refers to a user interface via which user operations are accepted. The operating portion 210 includes, for example, a cross-shaped key, an OK button, and the like, via which user operations are accepted.

The display monitor 220 is capable of displaying an image (through image) represented by image data generated by the CMOS image sensor 140, and an image represented by image data read out from the memory card 200. The display monitor 220 can also display various menu screens, etc., used for changing various settings of the digital video camera 100.

A gyrosensor 240 detects a shake in the yawing direction and a movement in the pitching direction based on the angular change over unit time, i.e., the angular velocity, of the digital video camera 100. The gyrosensor 240 outputs a gyro signal, representing the detected amount of movement, to the controller 180.

Note that the configuration described above is merely an example, and the digital video camera 100 may have any configuration as long as the image processing section 160 can perform an operation to be described below.

[1-3. Operation]

Now, an operation of the digital video camera 100 according to the present embodiment will be described. The digital video camera 100 of the present embodiment has the function of generating, from a first frame and a second frame contiguous in time with each other, an interpolation frame to be inserted between the first frame and the second frame.

Figure 2:
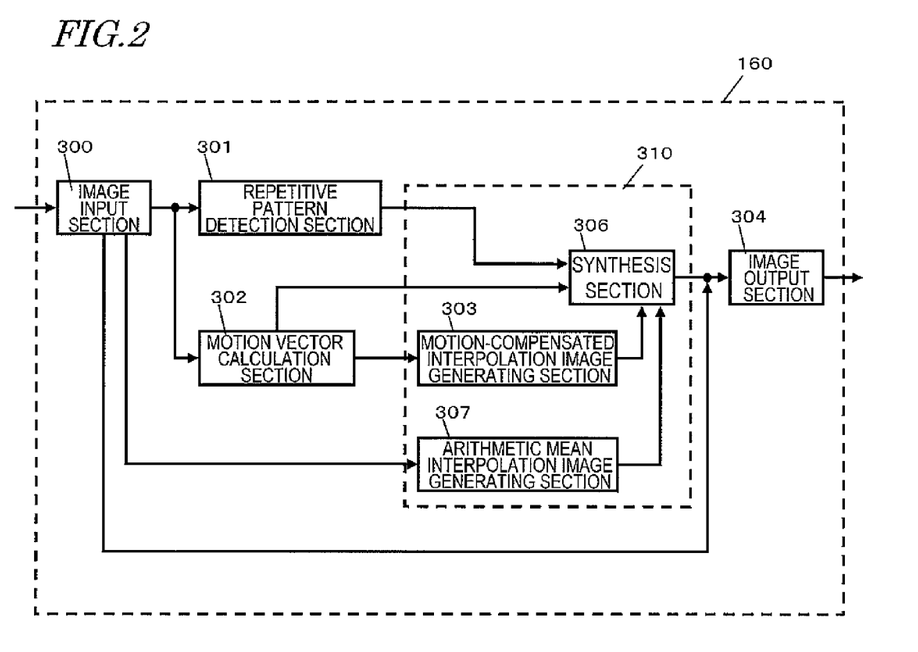
FIG. 2 is a block diagram showing a configuration of an image processing section of the digital video camera according to exemplary Embodiment 1.

FIG. 2 is a block diagram showing a configuration of the image processing section 160 for realizing the operation described above of the digital video camera 100 according to the present embodiment. The image processing section 160 includes: an image input section 300 for receiving moving picture data output from the image capturing section 400; a repetitive pattern detection section 301 for detecting whether a repetitive pattern is included in each of the frames of the moving picture data; a motion vector calculation section 302 for calculating a motion vector between two contiguous frames; an interpolation frame generation section 310 for generating an interpolation frame to be inserted between two frames; and an image output section 304 for outputting, to the outside, the moving picture data which has been interpolated with the interpolation frame. These elements may be implemented by individual circuit blocks physically separated from one another, or may be implemented by a processor provided in the image processing section 160 executing programs defining the processes of the elements.

The repetitive pattern detection section 301 detects whether a repetitive pattern is included in the image represented by each frame and, if a repetitive pattern is included, measures the repetition cycle thereof. The motion vector calculation section 302 calculates a motion vector by performing a matching operation between the first and second frames contiguous with each other. The interpolation frame generation section 310 includes: a motion-compensated interpolation image generating section 303 for generating an interpolation frame based on a motion vector; an arithmetic mean interpolation image generation section 307 for generating an interpolation frame obtained as the arithmetic mean between the first and second frames; and a synthesis section 306 for generating a correction frame based on the comparison result between the repetition cycle and the magnitude of the motion vector.

The operation of the digital video camera 100 during the image capturing operation will now be described.

When the power is turned ON, the controller 180 supplies power to various sections of the digital video camera 100. The digital video camera 100 can be switched between the shooting mode and the playback mode by a user operation, or the like. After power is supplied, if the digital video camera 100 has been set in the shooting mode, the controller 180 initializes the optical system 110, the CMOS image sensor 140, etc., to set up the camera ready for shooting. Upon completing the setup operation for shooting, the controller 180 controls the CMOS image sensor 140 to capture an image, instructs the image processing section 160 so as to convert the image signal, which has been converted by the A/D converter 150 to a digital signal, to a signal that can be displayed as the through image, and performs a control so that the generated through image is displayed on the display monitor 220. By looking at the through image displayed on the display monitor 220, the user can check the angle of view, the object, etc., during the image capturing operation. The user can depress a movie recording button (a part of the operating portion 210) at any point in time to instruct the controller 180 to record a moving picture. Upon receiving an instruction to record a moving picture, the controller 180 processes the image being captured by the CMOS image sensor 140 as a moving picture in a format in conformity with a predetermined standard, and starts recording the processed moving picture data on the memory card 200. On the other hand, the user can depress the movie recording button at any point in time during the movie recording operation to instruct the controller 180 to end the moving picture recording operation.

With the digital video camera 100, it is possible to change the frame rate of the moving picture captured during the movie recording operation. The time when the frame rate is changed may be, for example, when a user gives an instruction, when information (e.g., brightness information) obtained from the captured image is changed, or when a predetermined mode (e.g., a low-speed image capturing mode) is selected. Alternatively, a change of the frame rate may be programmed in advance.

When the frame rate needs to be changed, the image processing section 160 generates an interpolation frame image to be inserted between frame images. The process of generating the interpolation frame image by the image processing section 160 will now be described.

Figure 3:
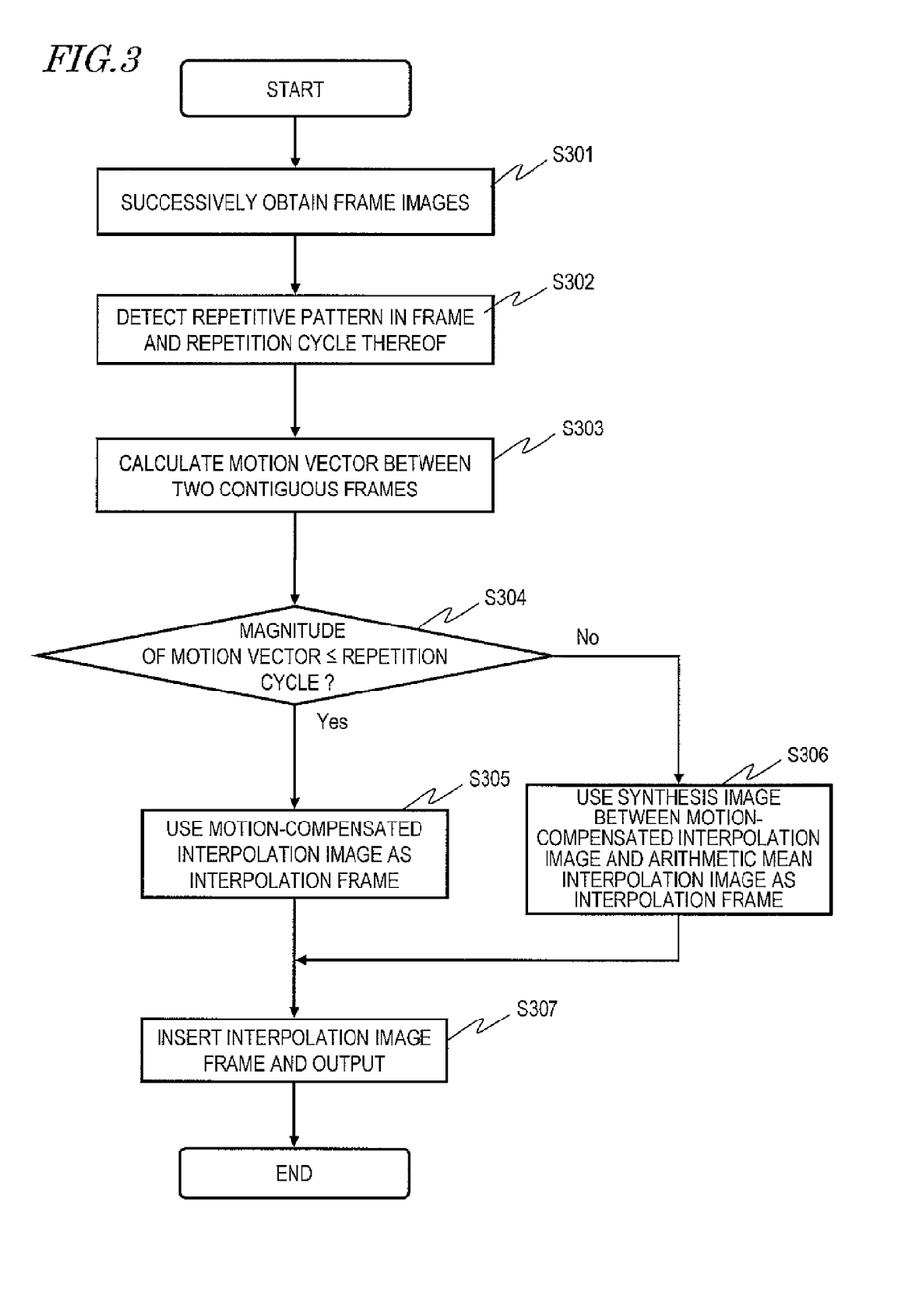
FIG. 3 is a flow chart showing an operation performed by the image processing section of the digital video camera according to exemplary Embodiment 1.

FIG. 3 is a flow chart showing the interpolation frame image generating process performed by the image processing section 160. First, the image input section 300 successively obtains frame images output from the image capturing section 400 (step S301). The frame images obtained by the image input section 300 are sent to the repetitive pattern detection section 301, the motion vector calculation section 302, the arithmetic mean interpolation image generation section 307, and the image output section 304.

For each of the frame images successively input from the image input section 300, the repetitive pattern detection section 301 detects whether a repetitive pattern, such as a fence, a lattice or a checker pattern, is present in an object included in the frame image. The repetitive pattern detection section 301 detects the width (repetition cycle) of the repetitive pattern (step S302). The details of the repetitive pattern detection process and the repetition cycle detection process will be described later. Information representing the presence/absence of a repetitive pattern and the repetition cycle thereof is sent to the synthesis section 306 in a correction frame generation section 310.

On the other hand, the motion vector calculation section 302 successively calculates a motion vector between two contiguous frames through a process to be described later, for each of the frames successively input from the image input section 300 (step S303). Information representing the calculated motion vector is sent to the synthesis section 306 and the motion-compensated interpolation image generating section 303 in the correction frame generation section 310.

Then, the synthesis section 306 in the correction frame generation section 310 compares the repetition cycle of the repetitive pattern with the magnitude of the motion vector, for the horizontal direction and the vertical direction in the frame image (step S304). Then, if the magnitude of the motion vector is less than or equal to the repetition cycle, the motion-compensated interpolation image generated by the motion-compensated interpolation image generating section 303 is used as the interpolation frame (step S305). On the other hand, if the magnitude of the motion vector is greater than the repetition cycle, a synthetic image between the motion-compensated interpolation image and the arithmetic mean interpolation image generated by the arithmetic mean interpolation image generation section 307 is used as the interpolation image (step S306). Then, the image output section 304 inserts the interpolation frame received from the synthesis section 306 between two contiguous frames, and outputs the resultant data to the image output section 304 (step S307).

The processes will now be described in detail.

Figure 4A:
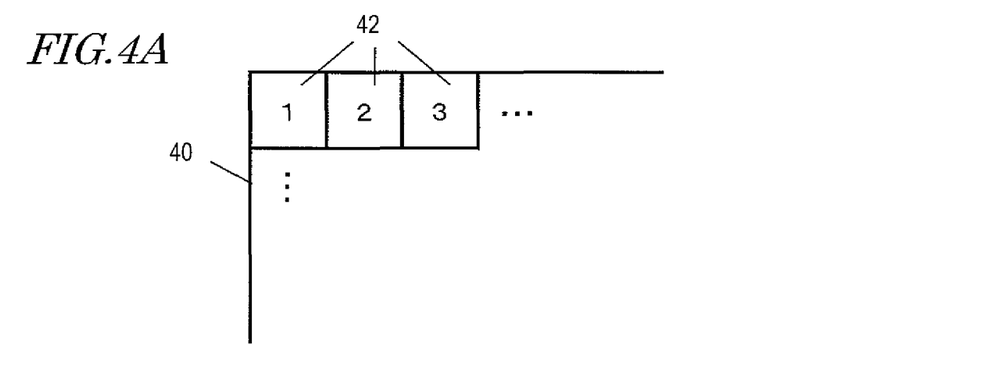
FIG. 4A is a diagram showing that each frame is divided into a plurality of macroblocks to be processed in order to detect a repetitive pattern.
Figure 4B:
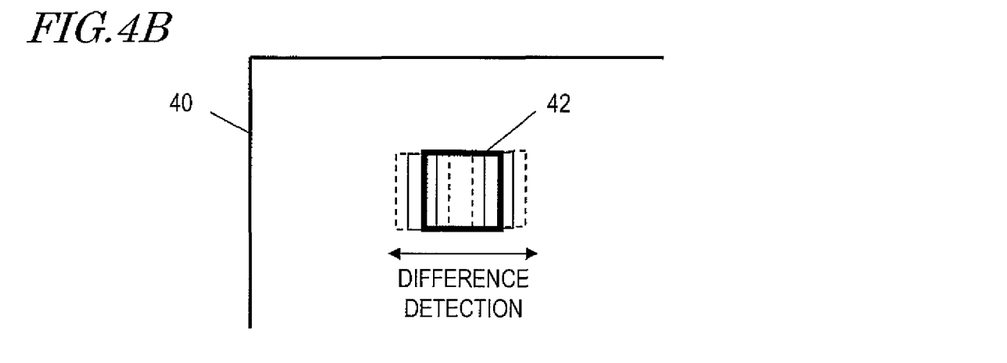
FIG. 4B is a diagram showing an operation of detecting a repetitive pattern with one macroblock shifting in the horizontal direction.
Figure 4C:
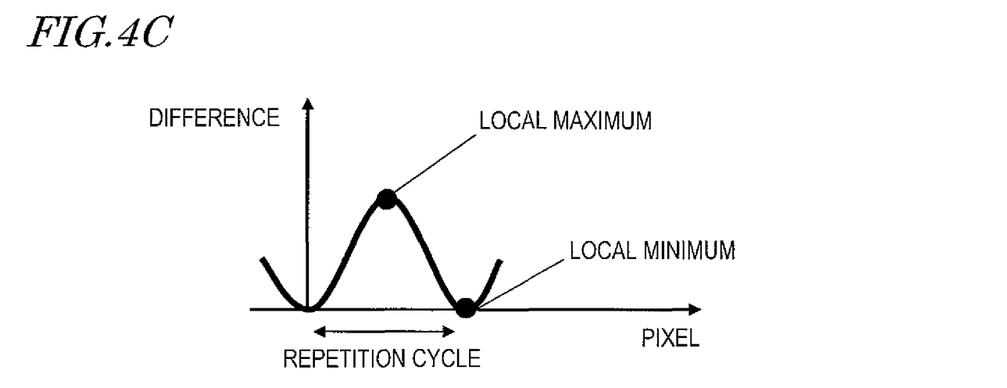
FIG. 4C is a graph showing the relationship of a difference evaluation value (SAD) with respect to the shift amount for one macroblock.

FIGS. 4A to 4C are diagrams illustrating specific examples of how the presence of a repetitive pattern is detected by a repetitive pattern detection section 301, and how the repetition cycle is detected. As shown in FIG. 4A, each frame 40 input to the repetitive pattern detection section 301 is processed by the unit of macroblocks 42 each including 16 pixels×16 pixels, for example. The repetitive pattern detection section 301 detects a repetitive pattern repeating in the horizontal direction by comparing each of the macroblocks 42 of the frame image with another block of 16 pixels×16 pixels that is shifted by pixels in the horizontal direction as shown in FIG. 4B. The difference is evaluated in terms of an evaluation function such as SAD (Sum of Absolute Difference) or SSD (Sum of Squared Difference). Although not shown in the figures, the repetitive pattern detection section 301 detects a repetitive pattern repeating in the vertical direction by comparing each of the macroblocks of the frame image with another block of 16 pixels×16 pixels that is shifted by pixels in the vertical direction. In the present embodiment, the detection of the repetitive pattern in the horizontal direction and that in the vertical direction are performed, for each macroblock, within the search area for a pattern matching operation performed for the calculation of the motion vector to be described later, but they may be performed within different search areas.

FIG. 4C is a graph plotting an example of the difference (SAD) obtained by shifting one macroblock by pixels in the horizontal direction. If a repetitive pattern is present within the search area of the macroblock being processed currently, a wave-shaped SAD plot with a local maximum value and a local minimum value is obtained as shown in FIG. 4C. The repetitive pattern detection section 301 detects, as the width (repetition cycle) of the repetitive pattern, the distance (unit: pixels) from the center position of the macroblock being processed to the pixel position at which SAD takes the local minimum value. On the other hand, if no repetitive pattern is present within the search area of the macroblock being processed currently, a wave-shaped SAD with a local maximum value and a local minimum value as shown in FIG. 4C is not obtained. That is, the repetitive pattern detection section 301 detects whether a repetitive pattern is present within the search area of the macroblock being processed based on whether there is obtained a wave-shaped SAD with a local maximum value and a local minimum value as shown in FIG. 4C.

In the present specification, a "repetitive pattern" refers to a pattern by which a unit pattern within a portion of an image repeats itself in one direction with a constant cycle. Herein, "a unit pattern within a portion of an image" means a pattern that is identified by the pixel values (brightness values, or values of a specific color component) of a plurality of pixels that are contained in a partial region of an image. More specifically, evaluation values (SAD, SSD, or the like) are determined of a block which is defined by a plurality of pixels that are contained in a partial region of an image, a block which is arrived at through a displacement of this block by a certain distance in one direction, and anywhere in between. If a waveform of the changing evaluation values relative to the amount of displacement contains at least one local maximum and at least one local minimum, this pattern is regarded as a "repetitive pattern". As used herein, a "local maximum" does not mean just any local maximum, but exclusively refers to a local maximum that is greater than a predetermined reference value. Similarly, a "local minimum" does not mean just any local minimum, but exclusively refers to a local minimum that is smaller than a predetermined reference value. The reference values for the local maximum and the local minimum are to be appropriately determined in accordance with the required performance. The predetermined reference value for the local minimum may be set to a value near "0", but does not need to be "0".

Figure 5A:
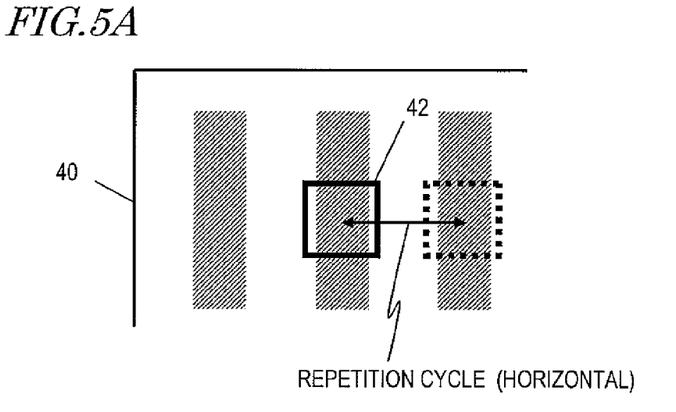
FIG. 5A is a diagram showing an example of a repetitive pattern repeating in the horizontal direction.

FIGS. 5A to 5D are diagrams showing specific examples where a repetition cycle is detected. FIG. 5A shows an example where an object having a repetitive pattern repeating in the horizontal direction (e.g., a fence) is present within the search area of the macroblock. In this example, a wave-shaped evaluation function similar to that shown in FIG. 4C is obtained by calculating an evaluation function such as SAD while moving the macroblock in the horizontal direction. Referring to FIG. 5A, when the macroblock is shifted to the position indicated by a dotted line from the position indicated by a solid line, the local minimum value of the difference is obtained. In this case, the amount of shift is detected as the repetition cycle in the horizontal direction.

Figure 5B:
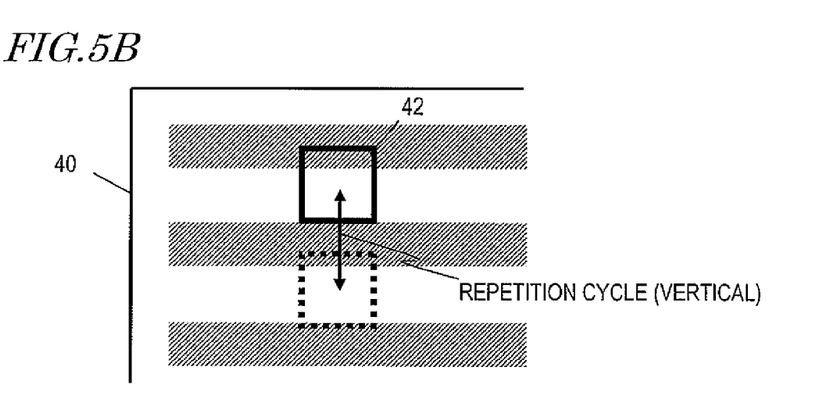
FIG. 5B is a diagram showing an example of a repetitive pattern repeating in the vertical direction.

FIG. 5B shows an example where an object having a repetitive pattern repeating in the vertical direction is present within the search area of the macroblock. In this example, a wave-shaped evaluation function similar to that shown in FIG. 4C is obtained by calculating an evaluation function such as SAD while moving the macroblock in the vertical direction. Also in FIG. 5B, when the macroblock is shifted to the position indicated by a dotted line from the position indicated by a solid line, the local minimum value of the difference is obtained. In this case, the amount of shift is detected as the repetition cycle in the vertical direction.

Figure 5C:
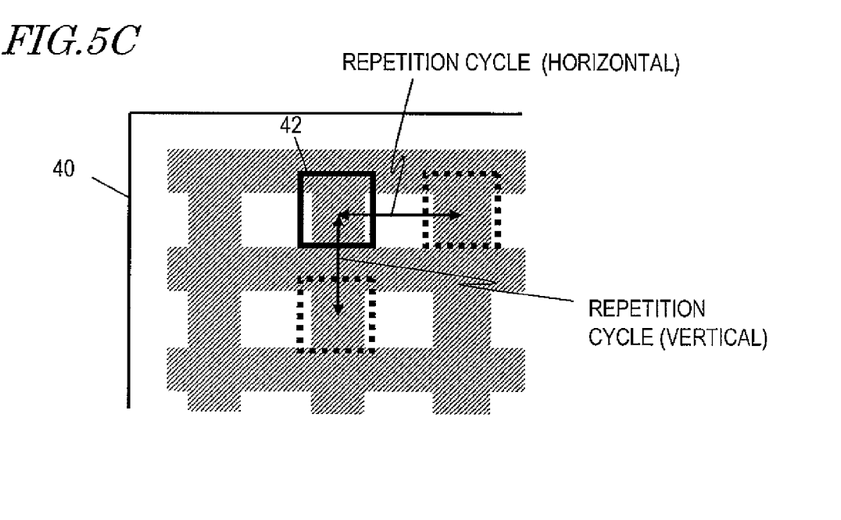
FIG. 5C is a diagram showing an example of a repetitive pattern repeating in the horizontal direction and in the vertical direction.

FIG. 5C shows an example where an object having a repetitive pattern repeating in the horizontal direction and in the vertical direction (e.g., a checker pattern) is present within the search area of the macroblock. In this example, a wave-shaped evaluation function similar to that shown in FIG. 4C is obtained for both of the horizontal direction and the vertical direction by calculating an evaluation function such as SAD while moving the macroblock in the horizontal direction and in the vertical direction. Also in FIG. 5C, when the macroblock is shifted to the position indicated by a dotted line from the position indicated by a solid line, the local minimum value of the difference is obtained. In this case, the amounts of shift are detected as the repetition cycle in the horizontal direction and that in the vertical direction.

Figure 5D:
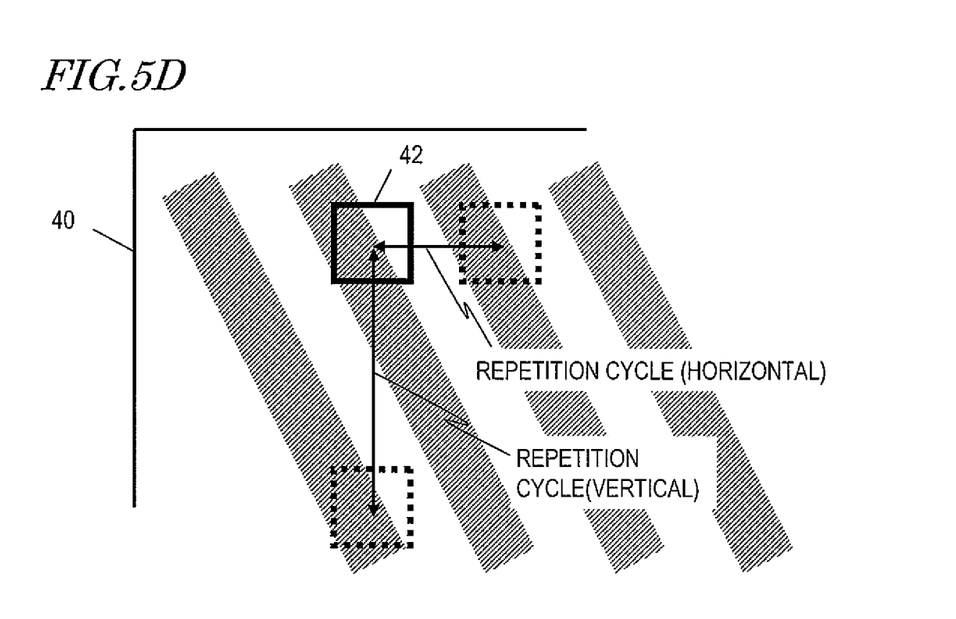
FIG. 5D is a diagram showing an example of a repetitive pattern repeating in a diagonal direction.

FIG. 5D shows an example where an object having a repetitive pattern repeating in a diagonal direction is present in the search area of the macroblock. Also in this example, a wave-shaped evaluation function similar to that shown in FIG. 4C is obtained for both of the horizontal direction and the vertical direction by calculating an evaluation function such as SAD while moving the macroblock in the horizontal direction and in the vertical direction. Also in FIG. 5D, when the macroblock is shifted to the position indicated by a dotted line from the position indicated by a solid line, the local minimum value of the difference is obtained. In this case, the amounts of shift are detected as the repetition cycle in the horizontal direction and that in the vertical direction.

Now, a specific example of a motion vector calculation operation performed by the motion vector calculation section 302 will be described.

The motion vector calculation section 302 obtains frames contiguous in time with each other from the image input section 300. The motion vector calculation section 302 detects the direction and the magnitude of the motion vector by the unit of macroblocks each including 16 pixels×16 pixels, for example, for the frames contiguous in time with each other. Specifically, the difference (e.g., SAD) is successively calculated by comparing a macroblock in one of the frames contiguous in time with each other with another block of 16 pixels×16 pixels in the other frame obtained by shifting, within a predetermined search area, from the pixel position corresponding to the macroblock in the horizontal direction and in the vertical direction. The motion vector calculation section 302 calculates the difference while gradually shifting the pixels. Then, the motion vector calculation section 302 detects the distance and the direction (the horizontal component and the vertical component) from the pixel corresponding to the center position of the macroblock being processed to the position of the pixel at which the difference takes the minimum. Through the process described above, the motion vector calculation section 302 calculates the motion vector.

Where SAD is used as the evaluation function, the motion vector (dx(x,y),dy(x,y)) at the coordinate position (x,y) on the image is determined by obtaining dx and dy that minimize the evaluation function P1(x,y,dx,dy) represented by Expression 1 below. Herein, the size of the macroblock, calculated in the number of pixels, in the horizontal direction (the x direction) of the image and that in the vertical direction (the y direction) are denoted as Bx and By, respectively. Of the two frames to be compared with each other, the pixel value (the brightness value or the value of a particular color component) of the preceding frame is denoted as L1, and that of the following frame as L2.

$$P1(x, y, dx, dy) = \sum_{i=-Bx/2}^{Bx/2} \sum_{j=-By/2}^{By/2} |L1(x+i, y+j) - L2(x+dx+i, y+dy+j)|$$ (Expression 1)

On the other hand, where SSD is used as the evaluation function, the motion vector (dx(x,y),dy(x,y)) at the coordinate position (x,y) on the image is determined by obtaining dx and dy that minimize the evaluation function P2(x,y,dx,dy) represented by Expression 2 below.

$$P2(x, y, dx, dy) = \sum_{i=-Bx/2}^{Bx/2} \sum_{j=-By/2}^{By/2} (L1(x+i, y+j) - L2(x+dx+i, y+dy+j))^2$$ (Expression 2)

By using an evaluation function represented by Expression 1 or 2, the motion vector calculation section 302 can calculate the motion vector (dx(x,y),dy(x,y)) for each macroblock.

The repetitive pattern detection section 301 notifies the synthesis section 306 of the repetition cycle, which correlates with the detected width of the repetitive pattern, i.e., the number of pixels. Similarly, the motion vector calculation section 302 notifies the synthesis section 306 of the calculated magnitude of the motion vector (a value which has been converted to the number of pixels).

The motion vector calculation section 302 sends the frames contiguous in time with each other obtained from the image input section 300 and the detected motion vector to the motion-compensated interpolation image generating section 303. The motion vector calculation section 302 sends the motion vector detected for each of the macroblocks of the frame being processed to the motion-compensated interpolation image generating section 303.

Now, the details of the process of the interpolation frame generation section 310 will be described.

The motion-compensated interpolation image generating section 303 shifts an image portion represented by the macroblock which was being processed when calculating motion vector from one of the frame images contiguous in time with each other to an intermediate position that is dictated by the motion vector. That is, where the motion vector of the macroblock is represented by (dx,dy), the image portion represented by the macroblock is shifted by (dx/2,dy/2). Hereinafter, this process will be referred to as the "motion-compensated interpolation". By similarly performing motion-compensated interpolation for the macroblocks of the frame, the motion-compensated interpolation image generating section 303 can generate an interpolation frame image (motion-compensated interpolation frame) to be inserted between frame images contiguous in time with each other. The motion-compensated interpolation image generating section 303 sends the generated motion-compensated interpolation frame image to the synthesis section 306. Note that the motion-compensated interpolation frame image does not always have to be an intermediate frame, as long as it is a frame representing a transitional state between the two contiguous frames generated based on the motion vector. For example, where two or more interpolation frames are inserted between two contiguous frames, a motion-compensated interpolation frame image represents a state that is closer to either one of the frames, rather than an intermediate state therebetween.

On the other hand, the arithmetic mean interpolation image generation section 307 obtains frames contiguous in time with each other from the image input section 300. Then, the arithmetic mean interpolation image generation section 307 calculates the arithmetic mean pixel by pixel for the two frames contiguous in time with each other, between which an interpolation frame is to be sandwiched. Thus, the arithmetic mean interpolation image generation section 307 generates the arithmetic mean interpolation frame image. The arithmetic mean interpolation image generation section 307 sends the generated arithmetic mean interpolation frame image to the synthesis section 306.

In step S304, the synthesis section 306 compares the repetition cycle (calculated in the number of pixels) notified from the repetitive pattern detection section 301 with the magnitude of the motion vector (calculated in the number of pixels) notified from the motion vector calculation section 302. While this comparison is performed for both of the horizontal direction and the vertical direction in the present embodiment, it may be done only for one direction. Based on the comparison result, the synthesis section 306 generates an interpolation frame image to be inserted between the frame images. Herein, the motion-compensated interpolation frame is denoted as F1 and the arithmetic mean interpolation frame as F2, with the coefficients thereof being α (0<α<1) and β (=1−α), respectively. The interpolation frame F to be eventually adopted is generated in accordance with the following expression.

$$F = \alpha F1 + \beta F2$$ (Expression 3)

where the calculation of Expression 3 is performed for each pixel, for example.

If the repetition cycle is greater than the magnitude of the motion vector for at least one of the horizontal direction and the vertical direction, there is a low possibility of an erroneous detection of a motion vector due to the presence of a repetitive pattern. Therefore, in such a case, the synthesis section 306 adopts the motion-compensated interpolation frame image as an interpolation frame image to be inserted between the frame images. On the other hand, if the repetition cycle is less than the magnitude of the motion vector for either one of the horizontal direction and the vertical direction, there is a higher possibility of an erroneous detection of a motion vector due to the presence of a repetitive pattern. Therefore, as the difference between the magnitude of the motion vector and the repetition cycle is larger, the proportion of the arithmetic mean interpolation frame image, which is not influenced by an erroneous detection of a motion vector, is increased.

Figure 6A:
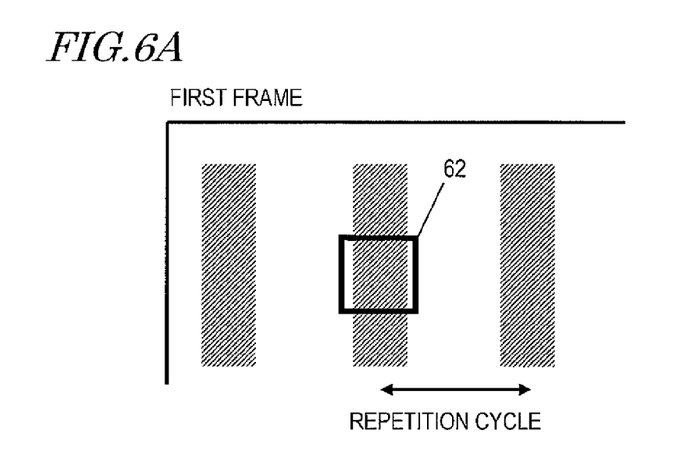
FIG. 6A is a diagram showing an example of a first frame having a repetitive pattern.
Figure 6B:
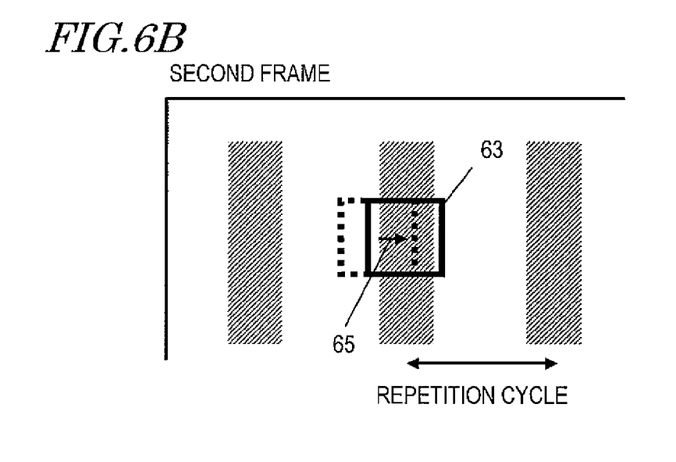
FIG. 6B is a diagram showing an example where the motion vector is calculated appropriately.
Figure 6C:
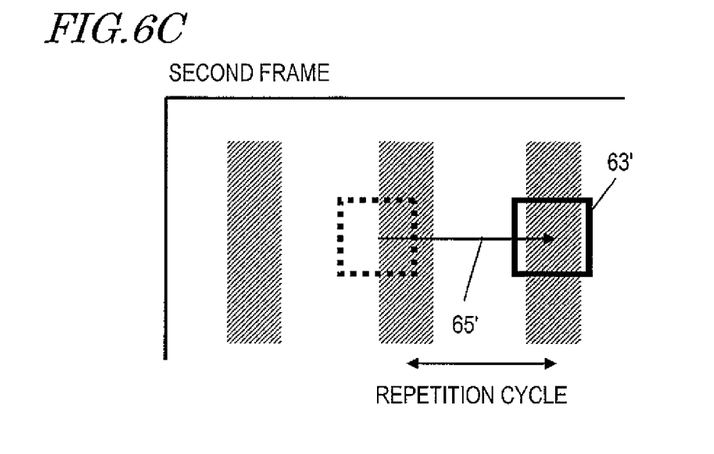
FIG. 6C is a diagram showing an example where the motion vector is not calculated appropriately.

FIGS. 6A to 6C are diagrams showing that there is a high possibility that a motion vector has been detected erroneously when the calculated magnitude of the motion vector is larger than the repetition cycle. FIG. 6A shows an example of a first frame in which a repetitive pattern is present. FIG. 6B shows an example of a second frame following the first frame. In the second frame, the repetitive pattern has shifted slightly to the right from the first frame. Therefore, an area 63 in the second frame corresponding to a macroblock 62 in the first frame is slightly shifted to the right. In this example, a vector 65 indicated by an arrow in FIG. 6B is the motion vector which is supposed to be detected.

However, the motion vector detection section 302 may determine, as the area corresponding to the macroblock 62, an area 63' shown in FIG. 6C, rather than the area 63 shown in FIG. 6B. In such a case, a vector 65' indicated by an arrow in FIG. 6C will be calculated as the motion vector. Generating a motion-compensated interpolation frame based on such a motion vector will lower the quality of the interpolated moving picture.

Such a problem is more likely to occur when the calculated magnitude of the motion vector is larger than the repetition cycle, and as the difference therebetween is larger. Therefore, when the calculated magnitude of the motion vector is larger than the repetition cycle, the synthesis section 306 of the present embodiment increases the proportion of the arithmetic mean interpolation frame which is less dependent on the motion vector as the difference is larger.

Figure 7:
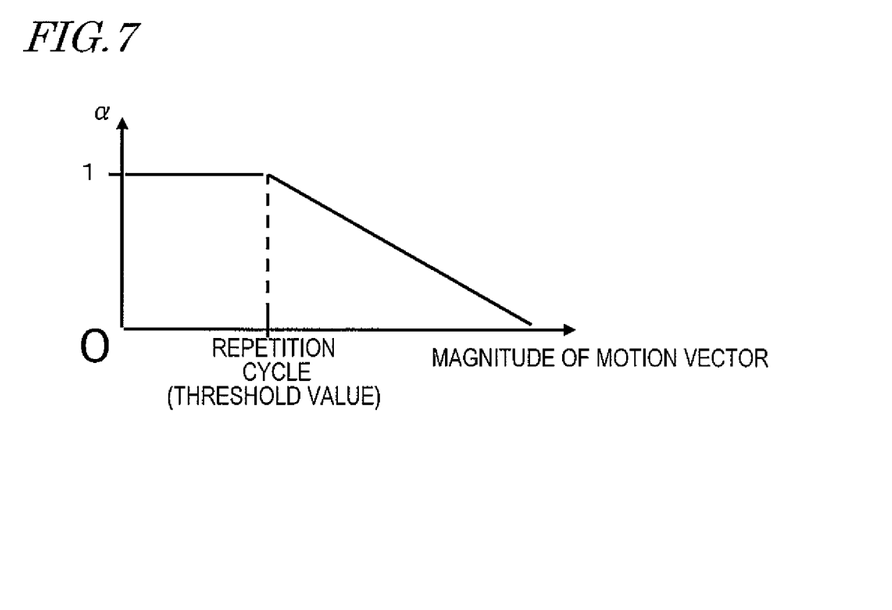
FIG. 7 is a graph showing the relationship between the magnitude of the motion vector and the coefficient a, where the width (repetition cycle) of the repetitive pattern is used as the threshold value.

FIG. 7 is a graph showing the relationship between the magnitude of the motion vector and the coefficient a, where the repetition cycle is used as the threshold value. As shown in FIG. 7, until the motion vector exceeds the repetition cycle (threshold value), the possibility of an erroneous detection of a motion vector is low, and therefore the motion-compensated interpolation frame image, which has a higher image quality, is adopted as the interpolation frame image to be inserted between the frame images. On the other hand, as the motion vector exceeds the repetition cycle (threshold value), the possibility of an erroneous detection of a motion vector increases, and therefore the adoption proportion $\alpha$ for the motion-compensated interpolation frame image is gradually decreased while the proportion $\beta$ ($=1-\alpha$) for the arithmetic mean interpolation frame image, which is not influenced by an erroneous detection of a motion vector, is increased. Thus, even if a repetitive pattern is included in an image of a frame obtained through an image capturing operation, it is possible to more appropriately generate an interpolation frame. Note that while the repetition cycle itself is used as the threshold value in this example, another value that is determined based on the repetition cycle may be used as the threshold value.

The synthesis section 306 sends the generated interpolation frame image to the image output section 304. The image output section 304 successively inserts interpolation frame images between corresponding frame images so that each generated interpolation frame image is inserted between a corresponding pair of frames contiguous in time with each other. Thus, the image processing section 160 can output a moving picture whose frame rate has been changed.

[1-4. Advantageous Effects, etc.]

As described above, in the present embodiment, an appropriate interpolation frame image to be inserted between frame images is generated based on the results of a comparison between the width (repetition cycle) of a repetitive pattern detected by the repetitive pattern detection section 301 and the magnitude of a motion vector calculated by the motion vector calculation section 302. Thus, it is possible to generate interpolation frame images while taking into consideration the erroneous detection of a motion vector due to a repetition cycle of a repetitive pattern. Therefore, even if the frame rate is changed to a higher frame rate, it is possible to display a moving picture of a higher image quality on the display monitor.

For the first direction on the image (e.g., the horizontal direction and/or the vertical direction), if the magnitude of the motion vector is less than the threshold value defined based on the repetition cycle of the repetitive pattern, the interpolation frame generation section 310 generates, as the interpolation frame, a frame (motion-compensated interpolation frame) representing the transitional state between the first and second frames dictated based on the motion vector, and otherwise generates, as the interpolation frame, a frame that is less dependent on the motion vector than a frame representing the transitional state. Therefore, where there is a high possibility of an erroneous detection of a motion vector, it is possible to avoid generation of a moving picture of a low image quality.

The threshold value can be set to the same value as the repetition cycle of the repetitive pattern in the first direction. Therefore, when there is a low possibility of an erroneous detection of a motion vector, i.e., when a motion vector smaller than the repetition cycle is detected, it is possible to generate an appropriate interpolation frame that reflects the motion of an object.

When the magnitude of the motion vector in the first direction is greater than the threshold value, the interpolation frame generation section 310 generates, as the interpolation frame, a frame obtained through a process including calculating the arithmetic mean between the first and second frames. Thus, when there is a possibility of an erroneous detection of a motion vector, it is possible to avoid generation of inappropriate interpolation frames.

When the magnitude of the motion vector in the first direction is greater than the threshold value described above, the interpolation frame generation section 310 generates, as the interpolation frame, a synthetic frame between a motion-compensated interpolation frame and an arithmetic mean interpolation frame. Moreover, the ratio of synthesis between the motion-compensated interpolation frame and the arithmetic mean interpolation frame is changed in accordance with the magnitude of the motion vector. Therefore, it is possible to generate a more natural interpolation frame, without causing abrupt changes in the content of the correction frame when the threshold value is passed.

Moreover, the interpolation frame generation section 310 compares the repetition cycle of the repetitive pattern in the second direction (e.g., the vertical direction) different from the first direction (e.g., the horizontal direction) with the magnitude of the motion vector in the second direction, and generates the interpolation frame based on the results of the comparison. Therefore, it is possible to generate more appropriate interpolation frames taking into consideration the repetition cycles in two directions.

With the motion vector calculation section 302, first and second frames contiguous with each other are divided into a plurality of portions (e.g., macroblocks described above), and matching is performed between the first and second frames for each of these portions, thereby calculating the motion vector for each portion. The interpolation frame generation section 310 generates the interpolation frame based on the motion vector calculated for each of these portions. Thus, it is possible to realize an interpolation process that reflects the motion of an object for each portion of the frame, and it is possible to generate a more appropriate interpolation frame.

(Other Embodiments)

Embodiment 1 has been described above as an example of the technique disclosed in the present application. However, the technique of this disclosure is not limited thereto, but is also applicable to other embodiments in which changes, replacements, additions, omissions, etc., are made as necessary. Different ones of the elements described in Embodiment 1 above may be combined together to obtain a new embodiment.

In view to this, other embodiments are illustrated hereinbelow.

The repetitive pattern detection is performed by the method of obtaining the difference (SAD, for example) while shifting the macroblock by pixels in the embodiment above, but the technique of the present disclosure is not limited thereto. Methods other than this are also applicable as long as it is possible with the methods to detect the presence/absence of a repetitive pattern and to detect the width of repetition.

The synthesis section 306 sets $\alpha=1$ when the magnitude of the camera motion is less than a predetermined threshold value, and linearly decreases $\alpha$ with respect to the magnitude of the camera motion when the threshold value is passed, as shown in FIG. 7, in the embodiment above, but the present disclosure is not limited thereto. The decrease of $\alpha$ with respect to the magnitude of the camera motion may be along a curve.

Figure 8:
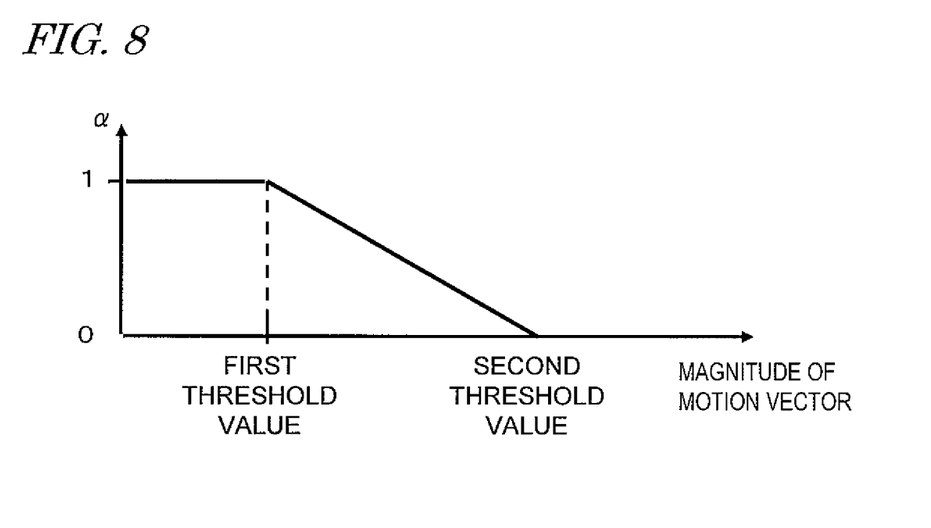
FIG. 8 is a graph showing the relationship between the magnitude of the motion vector and the coefficient a in another example where two threshold values are predetermined.

While one threshold value is set in the embodiment above, two or more threshold values may be set. For example, the synthesis section 306 may set $\alpha=1$ when the magnitude of the camera motion is less than or equal to the first threshold value, set $\alpha=0$ when it is greater than or equal to the second threshold value, and set a to a value between 0 to 1 when it is between the first threshold value and the second threshold value, as shown in FIG. 8. In this example, the second threshold value may be set to such a value that corresponds to the repetition cycle.

The repetitive pattern detection section 301 detects a repetitive pattern for the horizontal direction and for the vertical direction in the embodiment above, but the embodiment is not limited thereto. For example, an embodiment may be configured to detect a repetitive pattern for one of the horizontal direction and the vertical direction or for a diagonal direction.

The interpolation frame to be adopted when the magnitude of the motion vector is greater than the threshold value defined based on the repetition cycle is not limited to a synthetic frame between a motion-compensated interpolation frame and an arithmetic mean interpolation frame, but may be any frame as long as it is less dependent on the motion vector than a motion-compensated interpolation frame. For example, an arithmetic mean interpolation frame itself, or a first frame or a second frame itself may be used as an interpolation frame. For the latter case, the arithmetic mean interpolation image generation section 307 shown in FIG. 2 may be optional.

The embodiment above is directed to an example where the technique of the present disclosure is applied to the digital video camera 100 (image capturing apparatus). However, the application of the technique of the present disclosure is not limited to the image capturing apparatus, but the technique is also applicable to an image processing apparatus capable of serving as the image processing section 160 described above, for example. The configuration of such an image processing apparatus is similar to that shown in FIG. 2, for example, and the operation thereof is similar to that shown in FIG. 3, for example. For example, the image processing apparatus can obtain data of a moving picture that has been generated by a video camera and stored in a storage medium or transmitted via a telecommunications line at a later point in time, and insert an interpolation frame through the process described above to store the resultant data as another moving picture data.

The technique of the present disclosure may be further applicable to software (program) that defines the interpolation frame generating process described above. The operation defined by such a program is as shown in FIG. 3, for example. Such a program may be provided while being stored on a non-transitory computer-readable medium, such as in a portable storage medium, or may be provided through a telecommunications network. With a processor provided in a computer executing such a program, it is possible to realize the various operations described in the embodiment above.

Embodiments have been described above as an illustration of the technique of the present disclosure. The accompanying drawings and the detailed description are provided for this purpose.

Thus, elements appearing in the accompanying drawings and the detailed description include not only those that are essential to solving the technical problems set forth herein, but also those that are not essential to solving the technical problems but are merely used to illustrate the technique disclosed herein. Therefore, those non-essential elements should not immediately be taken as being essential for the reason that they appear in the accompanying drawings and/or in the detailed description.

The embodiments above are for illustrating the technique disclosed herein, and various changes, replacements, additions, omissions, etc., can be made without departing from the scope defined by the claims and equivalents thereto.

The application of the present disclosure is not limited to the digital video camera 100. That is, the present disclosure is applicable to image processing apparatuses capable of converting the frame rate, such as digital still cameras, information terminals equipped with cameras, personal computers, and server computers.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Applications No. 2012-002735 filed Jan. 11, 2012, and No. 2013-000800 filed Jan. 8, 2013, the entire contents of which are hereby incorporated by reference.

What is claimed is:

1. An image processing apparatus for generating an interpolation frame to be inserted between a first frame and a second frame of a moving picture contiguous with each other, the image processing apparatus comprising:
   a repetitive pattern detection section configured to detect whether a repetitive pattern is present in at least one of the first and second frames;
   a motion vector calculation section configured to calculate a motion vector of an object in the first and second frames; and
   an interpolation frame generation section configured to compare a repetition cycle of the repetitive pattern in a first direction with a magnitude of the motion vector in the first direction so as to generate the interpolation frame through a process performed based on a result of the comparison.

2. The image processing apparatus of claim 1, wherein the interpolation frame generation section configured to generate, as the interpolation frame, a frame representing a transitional state between the first and second frames defined based on the motion vector if the magnitude of the motion vector in the first direction is less than a threshold value defined based on the repetition cycle of the repetitive pattern in the first direction, and otherwise generate, as the interpolation frame, a frame that is less dependent on the motion vector than the frame representing the transitional state.

3. The image processing apparatus of claim 2, wherein the threshold value is set to be the same value as the repetition cycle of the repetitive pattern in the first direction.

4. The image processing apparatus of claim 2, wherein the interpolation frame generation section is configured to generate, as the interpolation frame, a frame obtained through a process including an arithmetic mean between the first and second frames if the magnitude of the motion vector in the first direction is greater than the threshold value.

5. The image processing apparatus of claim 2, wherein the interpolation frame generation section is configured to generate, as the interpolation frame, a synthetic frame between the frame representing the transitional state and a frame obtained by an arithmetic mean between the first and second frames if the magnitude of the motion vector in the first direction is greater than the threshold value.

6. The image processing apparatus of claim 5, wherein the interpolation frame generation section is configured to generate the synthetic frame by synthesizing together the frame representing the transitional state and the frame obtained by an arithmetic mean between the first and second frames at a ratio which changes depending on the magnitude of the motion vector in the first direction if the magnitude of the motion vector in the first direction is greater than the threshold value.

7. The image processing apparatus of claim 2, wherein the interpolation frame generation section is configured to use the first frame or the second frame as the interpolation frame if the magnitude of the motion vector in the first direction is greater than the threshold value.

8. The image processing apparatus of claim 1, wherein the interpolation frame generation section is configured to further compare a repetition cycle of the repetitive pattern in a second direction different from the first direction with a magnitude of the motion vector in the second direction so as to generate the interpolation frame based on a result of the comparison.

9. The image processing apparatus of claim 8, wherein the first direction is a horizontal direction of an image represented by each frame, and the second direction is a vertical direction of an image represented by each frame.

10. The image processing apparatus of claim 1, wherein:
    the motion vector calculation section is configured to divide each of the first and second frames into a plurality of portions, and performs a matching operation between the first and second frames for each of the divided portions to calculate the motion vector for the portion; and
    the interpolation frame generation section is configured to generate the interpolation frame based on the calculated motion vector for each of the portions.

11. An image capturing apparatus comprising:
    the image processing apparatus of claim 1; and
    an image capturing section configured to generate data of a moving picture including the first and second frames through an image capturing operation.

12. A computer program, stored on a non-transitory computer-readable medium, to be executed by a computer mounted in an image processing apparatus for generating an interpolation frame to be inserted between a first frame and a second frame of a moving picture contiguous with each other, the program instructing the computer to execute the steps of:
    detecting whether a repetitive pattern is present in at least one of the first and second frames;
    calculating a motion vector of an object in the first and second frames;
    comparing a repetition cycle of the repetitive pattern in a first direction with a magnitude of the motion vector in the first direction; and
    generating the interpolation frame through a process performed based on a result of the comparison.

* * * * *